(12) United States Patent
Oguri

(10) Patent No.: US 9,200,449 B2
(45) Date of Patent: Dec. 1, 2015

(54) BUILDING BOARD

(75) Inventor: Kazunori Oguri, Tajimi (JP)

(73) Assignee: Nichiha Corporation, Nagoya-shi (JP)

( * ) Notice: Subject to any disclaimer, the term of this patent is extended or adjusted under 35 U.S.C. 154(b) by 963 days.

(21) Appl. No.: 13/370,453

(22) Filed: Feb. 10, 2012

(65) Prior Publication Data

US 2012/0251780 A1 Oct. 4, 2012

(30) Foreign Application Priority Data

Mar. 31, 2011 (JP) ................................ 2011-077685

(51) Int. Cl.
| | |
|---|---|
| *B32B 3/00* | (2006.01) |
| *E04C 2/32* | (2006.01) |
| *E04F 13/08* | (2006.01) |
| *E04F 13/14* | (2006.01) |
| *B44C 5/04* | (2006.01) |

(52) U.S. Cl.
CPC . *E04C 2/324* (2013.01); *B44C 5/04* (2013.01); *E04F 13/0871* (2013.01); *E04F 13/14* (2013.01); *B32B 2451/00* (2013.01); *B32B 2607/00* (2013.01); *Y10T 428/2457* (2015.01); *Y10T 428/24479* (2015.01); *Y10T 428/24942* (2015.01)

(58) Field of Classification Search
CPC ............ B32B 2607/00; B32B 2451/00; Y10T 428/24479; Y10T 428/2457; Y10T 428/24942; E04C 2/324; E04F 13/0871
See application file for complete search history.

(56) References Cited

U.S. PATENT DOCUMENTS

| | | | | |
|---|---|---|---|---|
| 3,117,902 | A | * | 1/1964 | Holzhelmer ................... 156/217 |
| 3,414,181 | A | * | 12/1968 | Sloan ............................ 229/406 |
| 5,826,396 | A | * | 10/1998 | Michaels ........................ 52/631 |
| 6,723,259 | B1 | * | 4/2004 | Groth et al. .................. 264/1.34 |
| 7,338,612 | B2 | * | 3/2008 | Luetgert et al. ................ 216/29 |
| 2006/0272278 | A1 | * | 12/2006 | McMahan et al. ........... 52/782.1 |

FOREIGN PATENT DOCUMENTS

| | | |
|---|---|---|
| CA | 2027116 A1 | 4/1991 |
| CN | 201722881 U | 1/2011 |
| DE | 20 2004 015 954 U1 | 12/2004 |
| JP | 60-215163 | * 10/1985 |

(Continued)

OTHER PUBLICATIONS

English Abstract of cited JP 60-215163, Oct. 1985.*
The First Office Action (including an English translation), dated Dec. 22, 2014, issued in the corresponding Chinese Patent Application No. 201210043799.3.

(Continued)

*Primary Examiner* — Donald J Loney
(74) *Attorney, Agent, or Firm* — Birch, Stewart, Kolasch & Birch, LLP

(57) ABSTRACT

The present invention provides a building board having a flat shape in which a plurality of concave parts and convex parts are formed on a surface thereof, wherein the concave parts and the convex parts are arranged alternately and extend in the same direction, and wherein the concave parts and the convex parts are arranged such that widths thereof in a direction, in which the concave parts and the convex parts are alternately arranged, change gradually. It is preferred that the plurality of concave parts and convex parts be arranged such that the widths of the plurality of concave parts gradually increase or decrease and the widths of the plurality of convex parts gradually decrease or increase, in the direction in which the concave parts and the convex parts are alternately arranged.

15 Claims, 15 Drawing Sheets

(56) References Cited

FOREIGN PATENT DOCUMENTS

| JP | 2-24908 U | 2/1990 |
| JP | 5-40178 Y2 | 10/1993 |
| JP | 2002-356974 A | 12/2002 |
| JP | 2003-154510 A | 5/2003 |

OTHER PUBLICATIONS

The Patent Examination Report No. 1, dated Jan. 3, 2014, issued in the corresponding Australian Patent Application No. 2012200527.
Zhao Baixiang, "The Emotional Expression of Line in Visual Communication Design," Journal of Tianshui Normal University, vol. 30, No. 1, Jan. 2010, pp. 107-109.

* cited by examiner

BUILDING BOARD

BACKGROUND OF THE INVENTION

1. Field of the Invention

The present invention relates to a building board for configuring outer walls and inner walls of a building.

2. Description of the Related Art

In a conventional building, outer walls and inner walls are configured by installing a plurality of building boards on a structure frame of the building, and the building is provided with improved design properties with deep textured patterns on the surfaces of the building boards. One of the ways to improve the design properties is to form a curved surface shape on the surfaces of the building boards or to form the building boards into curved surfaces.

For example, Japanese Patent Application Publication No. 2003-154510 discloses a method for manufacturing an inorganic plate having a desired strong curved surface or a complicated curved surface shape.

The inorganic plate described in Japanese Patent Application Publication No. 2003-154510 has a curved surface or a section with a curved surface shape, providing favorable design properties, as well as a favorable appearance after installing the inorganic plate. Packaging is required on such inorganic plate in order to prevent the inorganic plate from being damaged or contaminated while being delivered to a client. However, stacking packaged inorganic plates is not easy, and the stacked packaged inorganic plates can collapse easily. Moreover, when installing the inorganic plate, a joint part of between the curved surface or the section with a curved surface shape and a section with a different shape tends to collect dust. Therefore, it is difficult to adjust the heights of the curved surface or the section with a curved surface shape and of the section with a different shape.

SUMMARY OF THE INVENTION

The present invention provides a building board that is flat but capable of easily achieving curved surface effects.

The present invention provides a building board. The building board of the present invention is a flat building board having a plurality of concave parts and convex parts on a surface thereof. The concave parts and the convex parts are arranged alternately and extend in the same direction. The concave parts and the convex parts are also arranged such that widths thereof in the direction in which the concave parts and the convex parts are arranged alternately change gradually. With these configurations, the building board can achieve the curved surface effects in spite of its flatness. The state of gradual change in the widths is a state in which the widths of the plurality of concave parts increase and the widths of the plurality of convex parts decrease, in the direction in which the concave parts and the convex parts are arranged alternately, or a state in which the widths of the plurality of convex parts increase and the widths of the plurality of convex parts increase, in the direction in which the concave parts and the convex parts are arranged alternately. Needless to say, the state of gradual change in the widths also includes a state in which the widths of the plurality of concave parts decrease and the widths of the plurality of convex parts increase, in the direction in which the concave parts and the convex parts are arranged alternately, and a state in which the widths of the plurality of concave parts decrease and the widths of the plurality of convex parts decrease, in the direction in which the concave parts and the convex parts are arranged alternately.

In addition, in the present invention, there may be two or more of a combination of a concave part and convex part arranged alternately. In different combinations, the concave part and the convex part may be formed in a manner as to be stretched in the same direction. In the direction in which the concave part and the convex part are stretched, it is more preferred that the arrangement of the concave part and the convex part be different in a combination of two adjacent parts.

Moreover, in the present invention, it is preferred that the width of the concave part and the width of the convex part change gradually in the direction in which the concave part and the convex part are stretched.

Furthermore, it is preferred that top parts of the plurality of convex parts be positioned in the same plane, in order to package the building board easily and prevent the packaged building board from collapsing. Positioning the top parts in the same plane means that the top parts of the plurality of convex parts are on the same level, and the top parts of the convex parts may be flat or curved. Forming the top parts of the plurality of convex parts flat enables easy packaging and prevents the packaged building board from collapsing.

It is preferred that the concave parts be inclined 60° or more, to achieve profound curved surface effects.

The present invention can provide a building board that is flat but capable of easily achieving curved surface effects. Because the building board of the present invention is flat, it can be packaged easily and prevented from collapsing when stacked. In addition, the building board does not collect dust even in the production thereof, and the height of the building board can be adjusted easily.

DESCRIPTION OF THE PREFERRED EMBODIMENTS

The present invention is described hereinafter in detail with reference to the diagrams.

Figure 1:
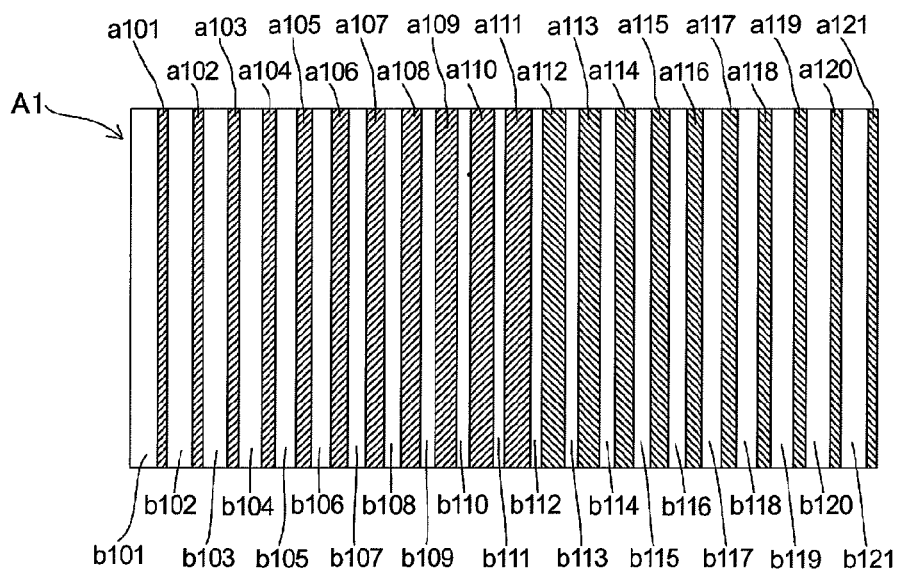
FIG. 1 is a front view of an embodiment of a building board according to the present invention.
Figure 2:
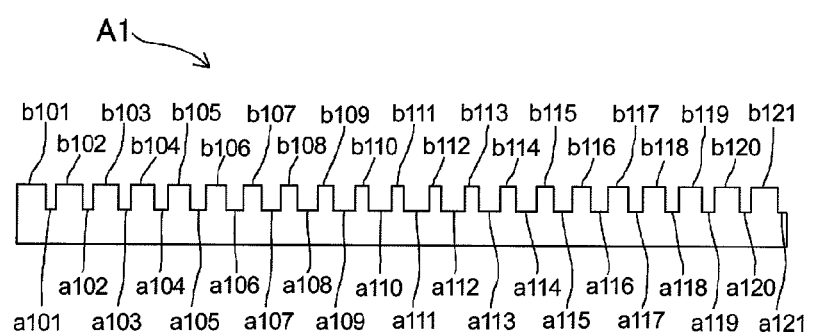
FIG. 2 is a bottom view of the building board shown in FIG. 1.

FIGS. 1 and 2 are a front view and a bottom view, respectively, illustrating an embodiment of a building board according to the present invention.

A building board A1 shown in FIGS. 1 and 2 is a flat plate made from an aluminosilicate hardening material. Concave parts and convex parts that extend in the same direction are arranged alternately on a surface of the flat plate. In other words, the plurality of concave parts and convex parts all extend in the same direction (a width direction of the building board A1) and are formed alternately on the surface of the building board A1.

The plurality of concave parts are arranged such that the widths thereof in the direction in which the concave parts and the convex parts are arranged alternately change gradually. More specifically, the direction of the building board A1 in which the concave parts and the convex parts are arranged alternately means a length direction of the building board A1 in which concave parts a101 to a121 are provided from left to right. The widths of these concave parts a101 to a121 in the length direction of the building board A1 change gradually as follows: concave part a101, 5.5 mm; concave part a102, 6.5 mm; concave part a103, 7 mm; concave part a104, 8 mm; concave part a105, 9 mm; concave part a106, 10 mm; concave part a107, 11 mm; concave part a108, 12 mm; concave part a109, 13 mm; concave part a110, 14 mm; concave part a111, 15.5 mm; concave part a112, 14 mm; concave part a113, 13 mm; concave part a114, 12 mm; concave part a115, 11 mm; concave part a116, 10 mm; concave part a117, 9 mm; concave part a118, 8 mm; concave part a119, 7 mm; concave part a120, 6.5 mm; and concave part a121, 5.5 mm. In other words, looking at the widths of the plurality of concave parts, the concave part a101 at the left to the concave part a111 in the center are arranged in the building board A1 such that the widths thereof increase gradually from the left to the center. The concave part a111 located in the center of the building board A1 has the largest width. The concave part a111 to the concave part a121 at a right end are arranged in the building board A1 such that the widths thereof decrease gradually from the center to the right. Note that the concave parts a101 to a121 are inclined 90°, and that surfaces of the concave parts a101 to a121 are on the same level. Furthermore, the widths of the concave parts a101 to a121 in the width direction of the building board A1 are constant.

The plurality of convex parts, too, are arranged such that the widths thereof in the direction in which the concave parts and the convex parts are arranged alternately change gradually. More specifically, the direction of the building board A1 in which the concave parts and the convex parts are arranged alternately means the length direction of the building board A1 in which convex parts b101 to b121 are provided from left to right. The widths of these convex parts b101 to b121 in the length direction of the building board A1 change gradually as follows: convex part b101, 17 mm; convex part b102, 16 mm; convex part b103, 15 mm; convex part b104, 14 mm; convex part b105, 13 mm; convex part b106, 12 mm; convex part b107, 11 mm; convex part b108, 10 mm; convex part b109, 9 mm; convex part b110, 8 mm; convex part b111, 7 mm; convex part b112, 7 mm; convex part b113, 8 mm; convex part b114, 9 mm; convex part b115, 10 mm; convex part b116, 11 mm; convex part b117, 12 mm; convex part b118, 13 mm; convex part b119, 14 mm; convex part b120, 15 mm; and convex part b121, 16 mm. In other words, looking at the widths of the plurality of convex parts, the convex part b101 at a left end to the convex part b111 in the center are arranged in the building board A1 such that the widths thereof decrease gradually from the left to the center. The convex parts b111, b112 located in the center of the building board A1 have the smallest width. The convex part b112 to the convex part b121 on the right are arranged in the building board A1 such that the widths thereof increase gradually from the center to the right. The tendency of the change in width of the plurality of concave parts in the direction in which the concave parts and the convex parts are arranged alternately, is the opposite of the tendency of the change in width of the plurality of convex parts in the same direction. Note that the convex parts b101 to b121 are on the same level and have flat top parts that are in the same plane. Furthermore, the widths of the convex parts b101 to b121 in the width direction of the building board A1 are constant.

According to the characteristics described above, although the building board A1 is a flat plate, the building board A1 appears to be curved when viewed from the front. Because the building board A1 is a flat plate having the top parts of the convex parts in the same plane, the building board A1, even packaged and stacked, does not collapse easily. In addition, the building board A1 does not collect dust even in the production thereof, and the height of the building board can be adjusted easily. The curved surface effects were the most profound when continuously installing a plurality of building board A1. The curved surface effects are described hereinafter.

Figure 3:
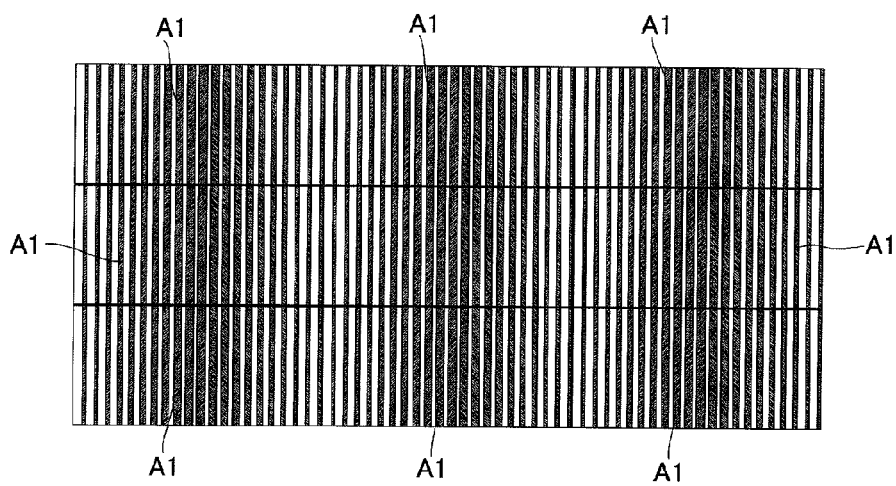
FIG. 3 is a diagram showing of a wall surface of a building that is formed using the building board shown in FIGS. 1 and 2.

FIG. 3 is a diagram showing of a wall surface of a building that is formed using the building board shown in FIGS. 1 and 2.

In FIG. 3, the wall surface of the building is formed by installing a plurality of the building boards A1 vertically and horizontally in a continuous manner, with end parts thereof aligned. The convex parts and the concave parts of each of the building board A1 are arranged continuously. Therefore, the wall surface configured by installing the plurality of building boards A1 appears as though the wall surface has a plurality of vertically wide curved surfaces in a horizontal direction, providing excellent design properties. Moreover, because the building boards A1 are flat, it is easy to install them. In addition, each building board A1 does not collect dust and the height thereof can be adjusted easily, because the top parts of the convex parts are flat and in the same plane.

Figure 4:
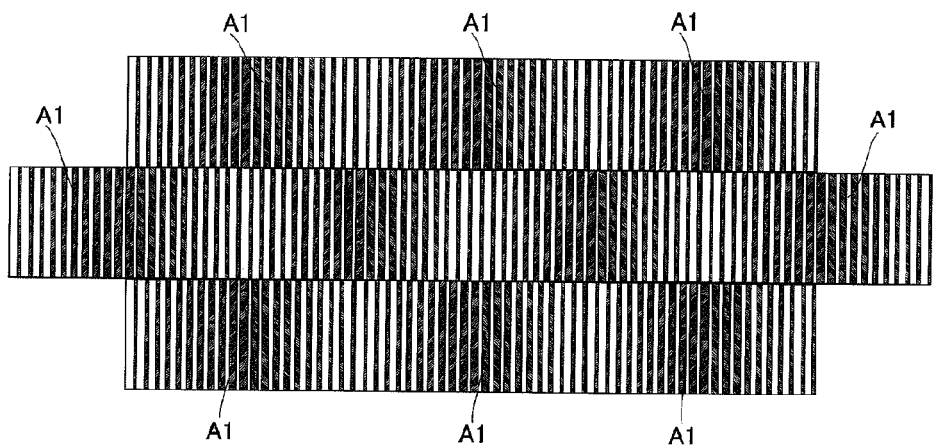
FIG. 4 is a diagram showing a wall surface of another building that is formed using the building board shown in FIGS. 1 and 2.

FIG. 4 is a diagram showing a wall surface of another building that is formed using the building board shown in FIGS. 1 and 2.

In FIG. 4, the wall surface of the building is formed using a plurality of the building boards A1, but end parts thereof are not aligned vertically. More specifically, after forming a first course of a plurality of the building boards A1 by arranging the building boards A1 horizontally in a continuous manner, a second course is formed on the first course by arranging a plurality of the building boards A1 horizontally in a continuous manner while having an end part thereof shifted to the left by half the horizontal width of the building boards A1. A third course is formed in the same manner as the first course by arranging a plurality of building boards A3. In other words, the convex parts and the concave parts of each building board A1 are not aligned vertically in a continuous manner. However, as shown in the wall surface of FIG. 4 as well, because the curved surface effects can be obtained in each building board A1, the wall surface appears to have a plurality of small curved surfaces, providing excellent design properties. Moreover, because the building boards A1 are flat, it is easy to install them. In addition, each building board A1 does not collect dust and the height thereof can be adjusted easily, because the top parts of the convex parts are flat and in the same plane.

Figure 5:
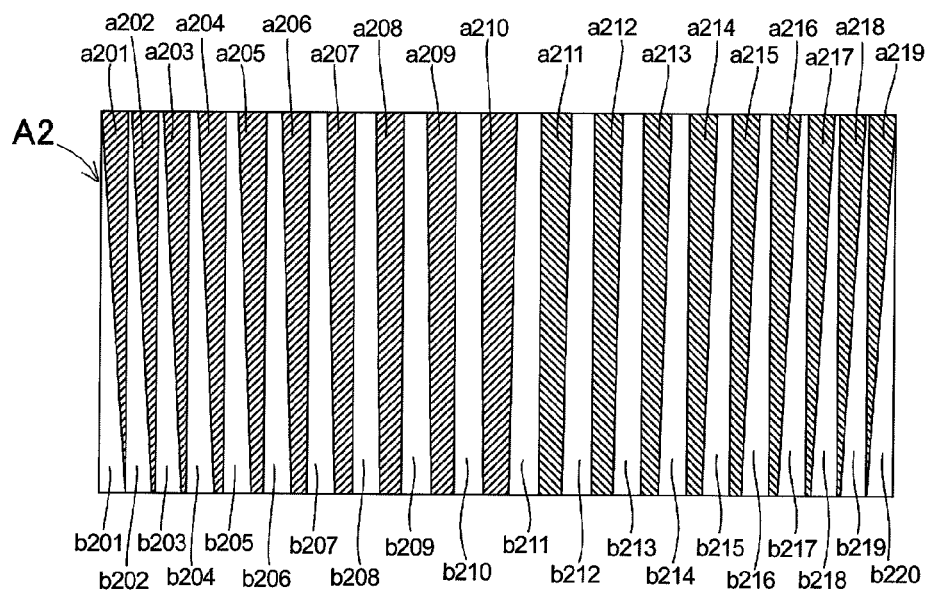
FIG. 5 is a front view of another embodiment of a building board according to the present invention.
Figure 6:
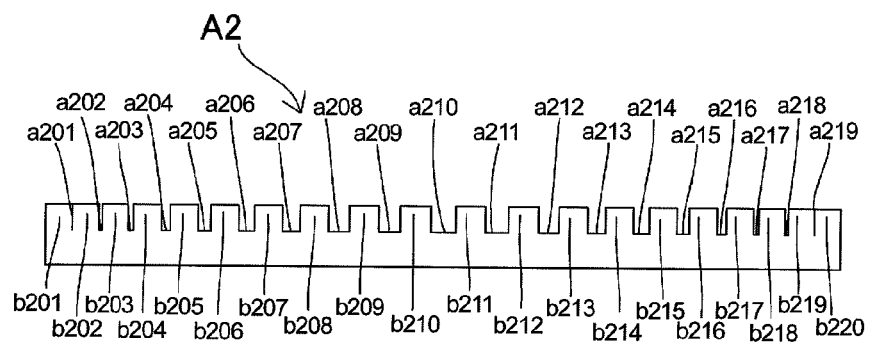
FIG. 6 is a bottom view of the building board shown in FIG. 5.

FIGS. 5 and 6 are a front view and a bottom view, respectively, illustrating another embodiment of a building board according to the present invention.

As with the building board A1 shown in FIGS. 1 and 2, a building board A2 shown in FIGS. 5 and 6 is also a flat plate made from an aluminosilicate hardening material. Concave parts and convex parts that extend in the same direction are arranged alternately on a surface of the flat plate. The plurality of concave parts are arranged such that the widths thereof in the direction in which the concave parts and the convex parts are arranged alternately change gradually. The plurality of convex parts also are arranged such that the widths thereof in the direction in which the concave parts and the convex parts are arranged alternately change gradually. The differences between the building board A1 and the building board A2 are that the building board A2 has the concave parts and the convex parts, the widths of which change in the direction in which the concave parts and the convex parts extend, and that the tendency of the change in width of the plurality of concave parts in the direction in which the concave parts and the convex parts are arranged alternately, is the same as the tendency of the change in width of the plurality of convex parts in the same direction. More specifically, the direction in which the concave parts and the convex parts are arranged alternately means a length direction of the building board A2 in which concave parts a201 to a219 are provided from left to right. On the upper side of the building board A2, the widths of these concave parts a201 to a219 in the length direction of the building board A2 are as follows: concave part a201, 15 mm; concave part a202, 15 mm; concave part a203, 15 mm; concave part a204, 16 mm; concave part a205, 16 mm; concave part a206, 16 mm; concave part a207, 16 mm; concave part a208, 16 mm; concave part a209, 17 mm; concave part a210, 20.5 mm; concave part a211, 17 mm; concave part a212, 16 mm; concave part a213, 16 mm; concave part a214, 16 mm; concave part a215, 16 mm; concave part a216, 16 mm; concave part a217, 15 mm; concave part a218, 15 mm; and concave part a219, 15 mm. On the lower side of the building board A2, the widths of these concave parts a201 to a219 in the length direction of the building board A2 are as follows: concave part a201, 0 mm; concave part a202, 2 mm; concave part a203, 3 mm; concave part a204, 5 mm; concave part a205, 7 mm; concave part a206, 9 mm; concave part a207, 10 mm; concave part a208, 12 mm; concave part a209, 13 mm; concave part a210, 14.5 mm; concave part a211, 13 mm; concave part a212, 12 mm; concave part a213, 10 mm; concave part a214, 9 mm; concave part a215, 7 mm; concave part a216, 5 mm; concave part a217, 3 mm; concave part a218, 2 mm; and concave part a219, 0 mm. In other words, the widths of the concave parts gradually narrow down toward the lower side. Regarding the convex parts, on the other hand, convex parts b201 to b220 are provided from left to right in the length direction of the building board A2. On the upper side of the building board A2, the widths of these convex parts b201 to b220 in the length direction of the building board A2 are as follows: convex part b201, 0 mm; convex part b202, 2 mm; convex part b203, 3 mm; convex part b204, 5 mm; convex part b205, 7 mm; convex part b206, 9 mm; convex part b207, 10 mm; convex part b208, 12 mm; convex part b209, 13 mm; convex part b210, 14 mm; convex part b211, 14 mm; convex part b212, 13 mm; convex part b213, 12 mm; convex part b214, 10 mm; convex part b215, 9 mm; convex part b216, 7 mm; convex part b217, 5 mm; convex part b218, 3 mm; convex part b219, 2 mm; and convex part b220, 0 mm. On the lower side of the building board A2, the widths of these convex parts b201 to b220 in the length direction of the building board A2 are as follows: convex part b201, 15 mm; convex part b202, 15 mm; convex part b203, 15 mm; convex part b204, 16 mm; convex part b205, 16 mm; convex part b206, 16 mm; convex part b207, 16 mm; convex part b208, 16 mm; convex part b209, 17 mm; convex part b210, 17 mm; convex part b211, 17 mm; convex part b212, 17 mm; convex part b213, 16 mm; convex part b214, 16 mm; convex part b215, 16 mm; convex part b216, 16 mm; convex part b217, 16 mm; convex part b218, 15 mm; convex part b219, 15 mm; and convex part b220, 15 mm. In other words, the widths of the convex parts gradually increase toward the lower side. The concave parts and the convex parts are formed such that the widths thereof gradually change in the direction in which the concave parts and the convex parts are arranged alternately, and such that the tendency of the change in width of the plurality of concave parts in the direction in which the concave parts and the convex parts are arranged alternately, becomes the same as the tendency of the change in width of the plurality of convex parts in the same direction.

However, as with the building board A1 shown in FIG. 1, the building board A2 also can obtain the curved surface effects, enabling easy packaging thereof and preventing the packaged building board from collapsing. In addition, each building board A2 does not collect dust and the height thereof can be adjusted easily.

Figure 7:
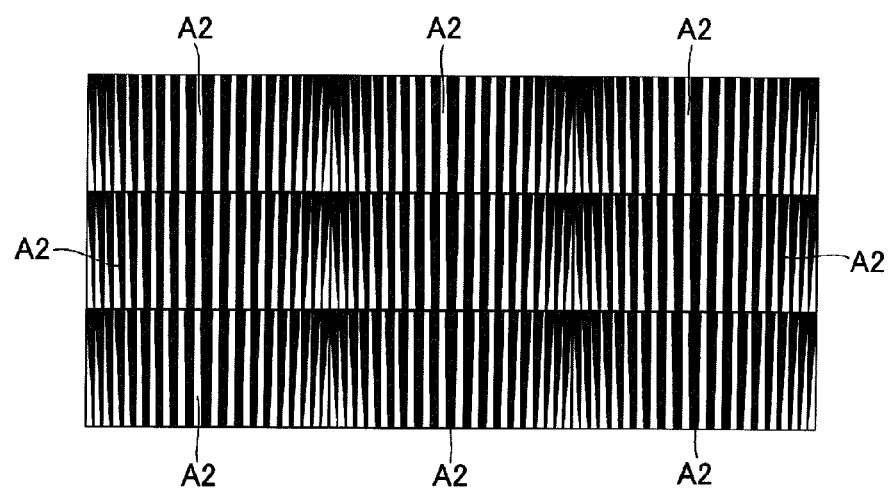
FIG. 7 is a diagram showing a wall surface of a building that is formed using the building board shown in FIGS. 5 and 6.

FIG. 7 is a diagram showing a wall surface of a building that is formed using the building board shown in FIGS. 5 and 6.

In FIG. 7, the wall surface of the building is formed by installing a plurality of the building boards A2 vertically and horizontally in a continuous manner, with end parts thereof aligned. Because the curved surface effects can be obtained in each building board A2, the wall surface appears to have a plurality of small curved surfaces when viewed from the front, providing excellent design properties. Moreover, because the building boards A2 are flat, it is easy to install them. In addition, each building board A2 does not collect dust and the height thereof can be adjusted easily, because the top parts of the convex parts are flat and in the same plane.

Figure 8:
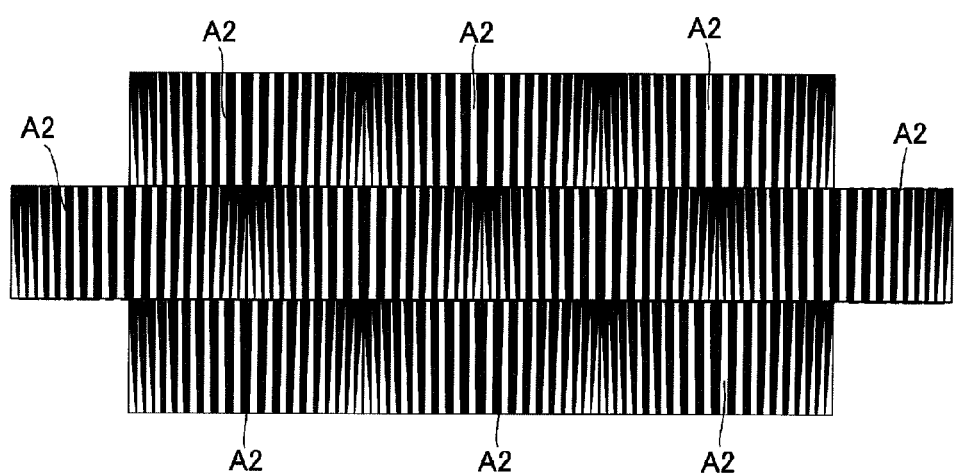
FIG. 8 is a diagram showing a wall surface of another building that is formed using the building board shown in FIGS. 5 and 6.

FIG. 8 is a diagram showing a wall surface of another building that is formed using the building board shown in FIGS. 5 and 6.

In FIG. 8, a plurality of the building boards A2 are arranged vertically while having an end part thereof shifted to the left by half the horizontal width of the building boards A2. However, the wall surface of FIG. 8 also appears to have a plurality of small curved surfaces when viewed from the front, providing excellent design properties. Moreover, because the building boards A2 are flat, it is easy to install them. In addition, each building board A2 does not collect dust and the height thereof can be adjusted easily, because the top parts of the convex parts are flat and in the same plane.

Figure 9:
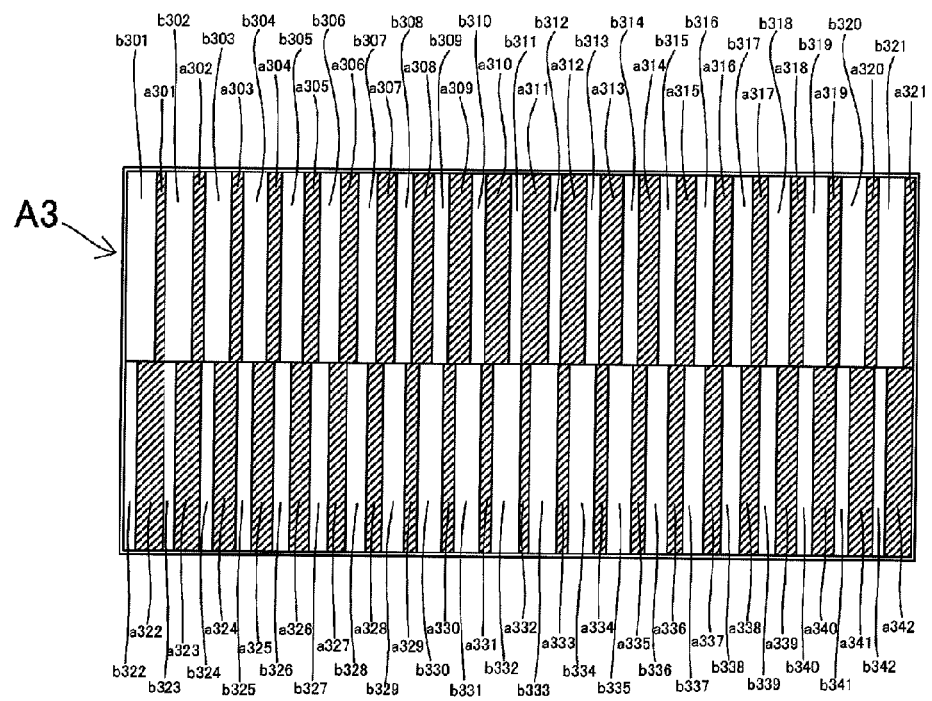
FIG. 9 is a front view of yet another embodiment of a building board according to the present invention.
Figure 10:
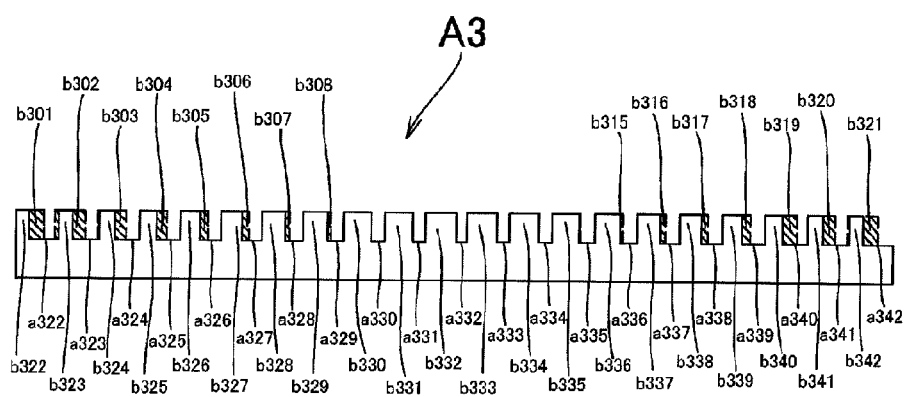
FIG. 10 is a bottom view of the building board shown in FIG. 9.

FIGS. 9 and 10 are a front view and a bottom view, respectively, illustrating another embodiment of a building board according to the present invention.

As with the building board A1 shown in FIGS. 1 and 2, a building board A3 shown in FIGS. 9 and 10 is also a flat plate made from an aluminosilicate hardening material. Concave parts and convex parts that extend in the same direction are arranged alternately on a surface of the flat plate. The plurality of concave parts are arranged such that the widths thereof in the direction in which the concave parts and the convex parts are arranged alternately change gradually. The plurality of convex parts also are arranged such that the widths thereof in the direction in which the concave parts and the convex parts are arranged alternately change gradually. The difference between the building board A1 and the building board A3 is that the building board A3 has two combinations of the alternate arrangements of the concave parts and the convex parts. More specifically, an upper half of the building board A3 is provided with concave parts a301 to a321 and convex parts b301 to b321, and a lower half of the building board A3 is provided with concave parts a322 to a342 and convex parts b322 to b342.

The upper half of the building board A3 is provided with the concave parts a301 to a321 from left to right, and the widths of these concave parts a301 to a321 in the length direction (the direction in which the concave parts and the convex parts are arranged alternately) of the building board A3 gradually change as follows: concave part a301, 5.5 mm; concave part a302, 6.5 mm; concave part a303, 7 mm; concave part a304, 8 mm; concave part a305, 9 mm; concave part a306, 10 mm; concave part a307, 11 mm; concave part a308, 12 mm; concave part a309, 13 mm; concave part a310, 14 mm; concave part a311, 15.5 mm; concave part a312, 14 mm; concave part a313, 13 mm; concave part a314, 12 mm; concave part a315, 11 mm; concave part a316, 10 mm; concave part a317, 9 mm; concave part a318, 8 mm; concave part a319, 7 mm; concave part a320, 6.5 mm; and concave part a321, 5.5 mm. In other words, the concave part a301 at the left to the concave part a311 in the center are arranged in the building board A3 such that the widths thereof increase gradually from the left to the center. The concave part a311 located in the center of the building board A3 has the largest width. The concave part a311 to the concave part a321 on a right end are arranged in the building board A3 such that the widths thereof decrease gradually from the center to the right. The upper half of the building board A3 is provided with the convex parts b301 to b321 from left to right, and the widths of these convex parts b301 to b321 in the length direction of the building board A3 gradually change as follows: convex part b301, 17 mm; convex part b302, 16 mm; convex part b303, 15 mm; convex part b304, 14 mm; convex part b305, 13 mm; convex part b306, 12 mm; convex part b307, 11 mm; convex part b308, 10 mm; convex part b309, 9 mm; convex part b310, 8 mm; convex part b311, 7 mm; convex part b312, 7 mm; convex part b313, 8 mm; convex part b314, 9 mm; convex part b315, 10 mm; convex part b316, 11 mm; convex part b317, 12 mm; convex part b318, 13 mm; convex part b319, 14 mm; convex part b320, 15 mm; and convex part b321, 16 mm. In other words, the convex part b301 at a left end to the convex part b311 in the center are arranged in the building board A3 such that the widths thereof decrease gradually from the left to the center. The convex parts b311, b312 located in the center of the building board A3 have the smallest width. The convex part b312 to the convex part b321 on the right are arranged in the building board A3 such that the widths thereof increase gradually from the center to the right.

The widths of the concave parts and the convex parts in the length direction of the lower half of the building board A3 are different than those in the upper half of the building board A3. More specifically, the lower half of the building board A3 is provided with the concave parts a322 to a342 from left to right, and the widths thereof in the length direction of the building board A3 gradually change as follows: concave part a322, 15.5 mm; concave part a323, 14 mm; concave part a324, 13 mm; concave part a325, 12 mm; concave part a326, 11 mm; concave part a327, 10 mm; concave part a328, 9 mm; concave part a329, 8 mm; concave part a330, 7 mm; concave part a331, 6.5 mm; concave part a332, 5.5 mm; concave part a333, 6.5 mm; concave part a334, 7 mm; concave part a335, 8 mm; concave part a336, 9 mm; concave part a337, 10 mm; concave part a338, 11 mm; concave part a339, 12 mm; concave part a340, 13 mm; concave part a341, 14 mm; and concave part a342, 15.5 mm. In other words, the concave part a322 at the left to the concave part a332 in the center are arranged in the building board A3 such that the widths thereof decrease gradually from the left to the center. The concave part a332 located in the center of the building board A3 has the smallest width. The concave part a332 to the concave part a342 on a right end are arranged in the building board A3 such that the widths thereof increase gradually from the center to the right. The lower half of the building board A3 is provided with the convex parts b322 to b342 from left to right, and the widths thereof in the length direction of the building board A3 gradually change as follows: convex part b322, 7 mm; convex part b323, 7 mm; convex part b324, 8 mm; convex part b325, 9 mm; convex part b326, 10 mm; convex part b327, 11 mm; convex part b328, 12 mm; convex part b329, 13 mm; convex part b330, 14 mm; convex part b331, 15 mm; convex part b332, 16 mm; convex part b333, 16 mm; convex part b334, 15 mm; convex part b335, 14 mm; convex part b336, 13 mm; convex part b337, 12 mm; convex part b338, 11 mm; convex part b339, 10 mm; convex part b340, 9 mm; convex part b341, 8 mm; and convex part b342, 7 mm. In other words, the concave part b322 at a left end to the concave part b332 in the center are arranged in the building board A3 such that the widths thereof increase gradually from the left to the center. The concave parts b332, b333 located in the center of the building board A3 have the largest width. The concave part b333 to the concave part b342 on the right are arranged in the building board A3 such that the widths thereof decrease gradually from the center to the right. Note that the concave parts a301 to a342 are inclined 90°, and that surfaces of the concave parts a301 to a342 are on the same level. Furthermore, the widths of the concave parts a301 to a342 in the width direction of the building board A3 are constant. In addition, top part of surfaces of the concave parts b301 to b342 are flat and in the same plane, and the widths of the convex parts b301 to b342 in the width direction of the building board A3 are constant.

However, as with the building board A1 shown in FIG. 1, the building board A3 also can obtain the curved surface effects, enabling easy packaging thereof and preventing the packaged building board from collapsing. In addition, each building board A3 does not collect dust and the height thereof can be adjusted easily.

Figure 11:
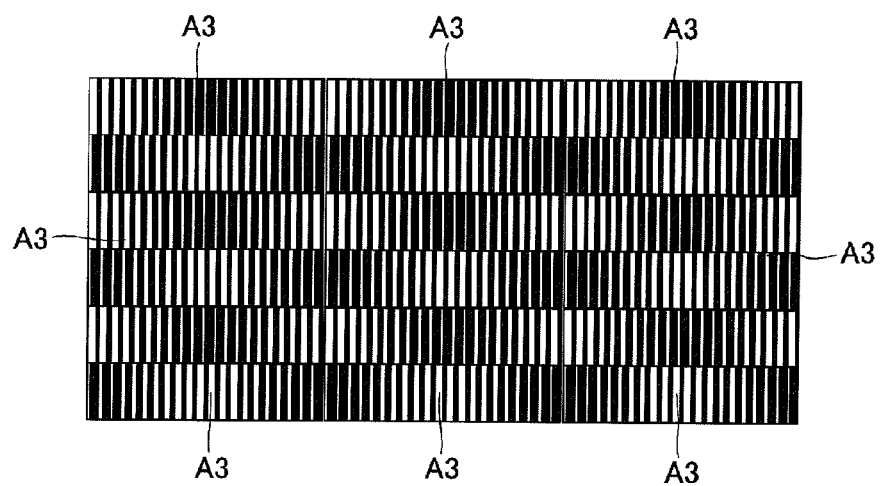
FIG. 11 is a diagram showing a wall surface of a building that is formed using the building board shown in FIGS. 9 and 10.

FIG. 11 is a diagram showing a wall surface of a building that is formed using the building board shown in FIGS. 9 and 10.

In FIG. 11, the wall surface of the building is formed by installing a plurality of the building boards A3 vertically and horizontally in a continuous manner, with end parts thereof aligned. Because each building board A3 has two combinations of the formations of the plurality of concave parts and convex parts, the wall surface, obtained by installing the plurality of building boards A3, appears to have a plurality of small curved surfaces when viewed from the front, providing excellent design properties. Moreover, because the building boards A3 are flat, it is easy to install them. In addition, each building board A3 does not collect dust and the height thereof can be adjusted easily, because the top parts of the surfaces of the convex parts are flat and in the same plane.

Figure 12:
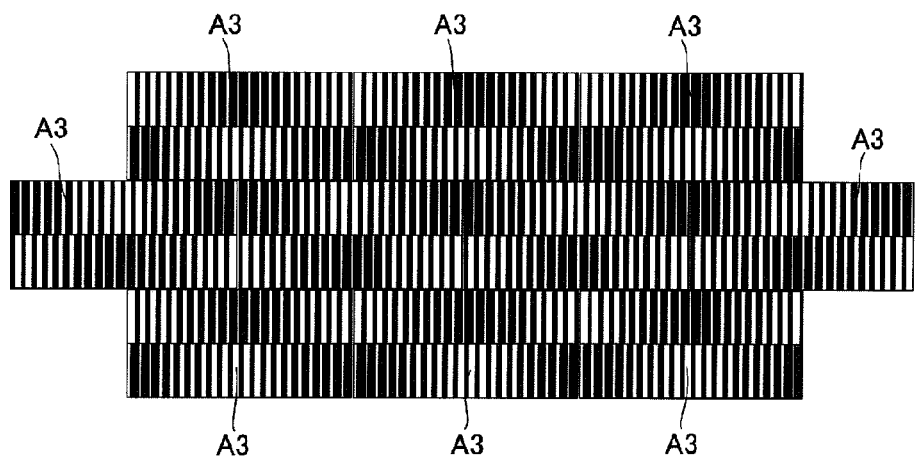
FIG. 12 is a diagram showing a wall surface of another building that is formed using the building board shown in FIGS. 9 and 10.

FIG. 12 is a diagram showing a wall surface of another building that is formed using the building board shown in FIGS. 9 and 10.

In FIG. 12, the wall surface of the building is formed using a plurality of the building boards A3, but end parts thereof are not aligned vertically. More specifically, after forming a first course of a plurality of the building boards A3 by arranging the building boards A3 horizontally in a continuous manner, a second course is formed on the first course by arranging a plurality of the building boards A3 horizontally in a continuous manner while having an end part thereof shifted to the left by half the horizontal width of the building boards A3 and having the building boards A3 inverted vertically. A third course is formed in the same manner as the first course by arranging a plurality of building boards A3. However, the wall surface shown in FIG. 12, too, appears to have a plurality of small curved surfaces, providing excellent design properties. Moreover, because the building boards A3 are flat, it is easy to install them. In addition, each building board A3 does not collect dust and the height thereof can be adjusted easily, because the top parts of the surfaces of the convex parts are flat and in the same plane.

Figure 13:
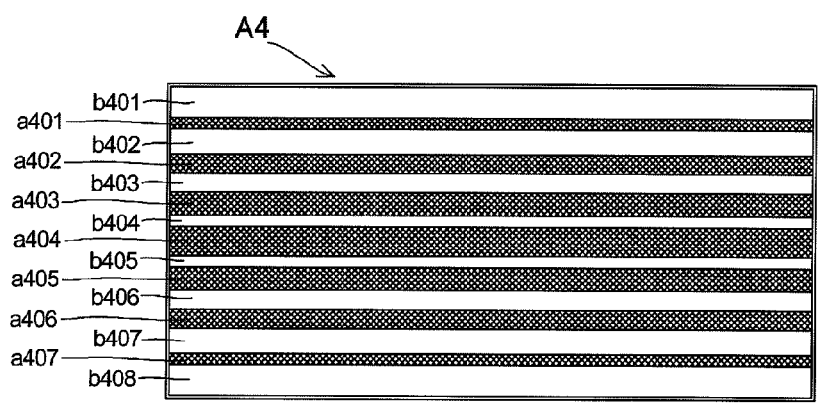
FIG. 13 is a front view of yet another embodiment of a building board according the present invention.
Figure 14:
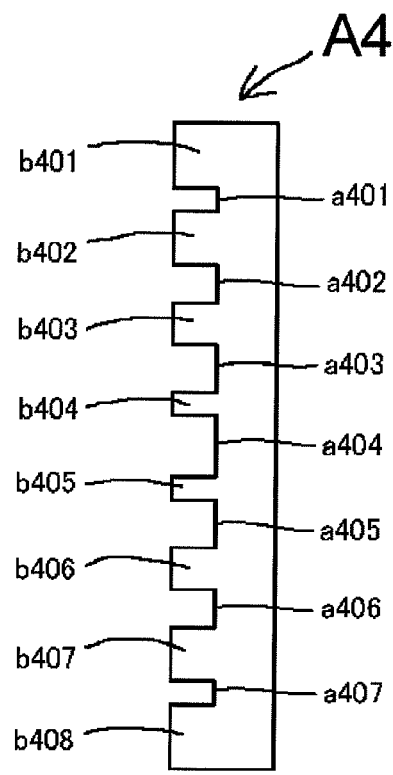
FIG. 14 is a side view of the building board shown in FIG. 13.

FIGS. 13 and 14 are a front view and a bottom view, respectively, illustrating another embodiment of a building board according to the present invention.

As with the building board A1 shown in FIGS. 1 and 2, a building board A4 shown in FIGS. 13 and 14 is also a flat plate made from an aluminosilicate hardening material, and a plurality of concave parts and convex parts are formed on a surface of the flat plate. However, the concave parts and the convex parts of the building board A4 extend in a length direction of the building board A4. The difference between the building board A4 and the building board A1 is that in the building board A4, the direction in which the concave parts and the convex parts is a width direction of the building board A4. The plurality of concave parts are formed such that the widths thereof in the width direction of the building board A4 change gradually. The plurality of convex parts also are formed such that the widths thereof in the width direction of the building board A4 change gradually. More specifically, concave parts a401 to a407 are formed, from top down, in the width direction of the building board A4. The widths of these concave parts a401 to a407 in the width direction of the building board A4 are as follows: concave part a401, 8 mm; concave part a402, 13 mm; concave part a403, 16 mm; concave part a404, 20.7 mm; concave part a405, 16 mm; concave part a406, 13 mm; and concave part a407, 8 mm. In other words, the concave part a401 at a top end to the concave part a404 in the center are arranged in the building board A4 such that the widths thereof increase gradually from the top to the center. The concave part a404 located in the center of the building board A4 has the largest width. The concave part a404 to the concave part a407 at the bottom are arranged in the building board A4 such that the widths thereof decrease gradually from the center to the bottom. Regarding the convex parts, on the other hand, convex parts b401 to b408 are provided, from top down, in the width direction of the building board A4. The widths of these convex parts b401 to b408 in the width direction of the building board A4 are as follows: convex part b401, 22 mm; convex part b402, 18 mm; convex part b403, 14 mm; convex part b404, 8 mm; convex part b405, 8 mm; convex part b406, 14 mm; convex part b407, 18 mm; and convex part b408, 22 mm. In other words, the convex part b401 at the top to the convex part b404 in the center are arranged in the building board A4 such that the widths thereof decrease gradually from the top to the center. The convex parts b404, b405 located in the center of the building board A4 have the smallest width. The convex part b405 to the convex part b408 at a lower end of the building board A4 are arranged in the building board A4 such that the widths thereof increase gradually from the center to the lower end. Note that top parts of surfaces of the convex parts b401 to b408 are flat and in the same plane, and that the widths of these convex parts b401 to b408 in the length direction of the building board A4 are constant.

Moreover, the building board A4 also can obtain the curved surface effects, enabling easy packaging thereof and preventing the packaged building board from collapsing. In addition, each building board A4 does not collect dust and the height thereof can be adjusted easily.

Figure 15:
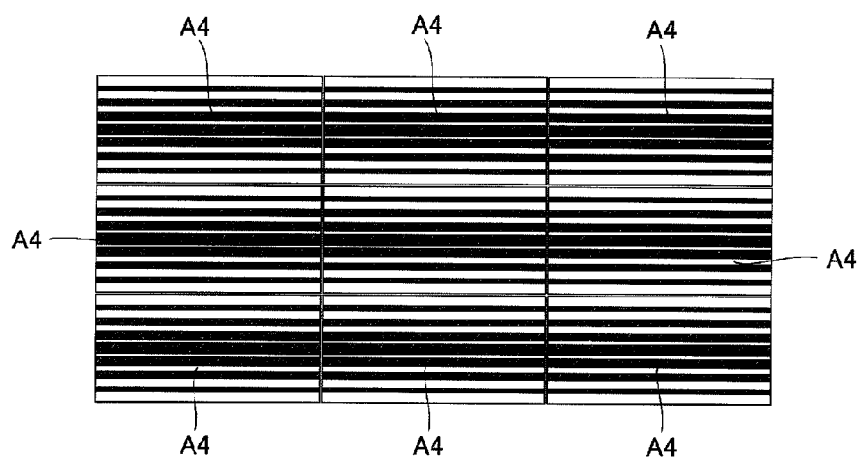
FIG. 15 is a diagram showing a wall surface of a building that is formed using the building board shown in FIGS. 13 and 14.

FIG. 15 is a diagram showing a wall surface of a building that is formed using the building board shown in FIGS. 13 and 14.

In FIG. 15, the wall surface of the building is formed by installing a plurality of the building boards A4 vertically and horizontally in a continuous manner, with end parts thereof aligned. The wall surface, obtained by installing the plurality of building boards A4, appears to have a plurality of curved surfaces in the vertical direction when viewed from the front, providing excellent design properties. Moreover, because the building boards A4 are flat, it is easy to install them. In addition, each building board A4 does not collect dust and the height thereof can be adjusted easily, because the top parts of the surfaces of the convex parts are flat and in the same plane.

The above has described the embodiments of the present invention. However, the present invention is not limited to these embodiments, and various modifications can be made within the scope of the present invention as defined in the claims appended hereto.

As described above, the present invention can provide a building board that is flat but capable of easily achieving the curved surface effects. Because the building board of the present invention is flat, it can be packaged easily and prevented from collapsing when stacked. In addition, the building board does not collect dust even in the construction thereof, and the height of the building board can be adjusted easily.

What is claimed is:

1. A building board having a curved optical illusion effect, comprising:
   said building board having a front and a back surface, wherein
   the back of the building board is substantially flat and the front of the building board is configured with a plurality of vertical or horizontal sections each containing a convex member and a concave member that are adjacent to each other, which convex and concave members in the plurality of vertical or horizontal sections are arranged in an alternating pattern, so as to produce an optical illusion of a curved surface when a plurality of said building boards are contiguously joined in a geometric pattern;
   a width of the concave members of said plurality of vertical or horizontal sections gradually decreases from concave member to concave member over at least about one-half of the total length or width of the building board,
   a width of the concave members of said plurality of vertical or horizontal sections gradually increases from concave member to concave member over at least about one-half of the total length or width of the building board,
   a width of the convex members of said plurality of vertical or horizontal sections gradually increases from convex member to convex member over at least about one-half of the total length or width of the building board, or a width of the convex members of said plurality of vertical or horizontal sections gradually decreases from convex member to convex member over at least about one-half of the total length or width of the building board.

2. The building board according to claim 1, wherein a combined width of the adjacent convex and concave member of each of the plurality of vertical or horizontal sections is substantially equal.

3. The building board according to claim 1, wherein
the concave members and convex members are arranged such that i) a concave member that is located substantially in the middle of the building board has the smallest width of the concave members in the vertical or horizontal sections, ii) the widths of concave members gradually increase with increases in distance from the middle of the building board, iii) a convex member that is located substantially in the middle of the building board has the largest width of the convex members in the vertical or horizontal sections, and iv) the widths of the convex members gradually decrease with increases in distance from the middle of the building board.

4. The building board according to claim 1, wherein
the concave members and convex members are arranged such that i) a concave member that is located substantially in the middle of the building board has the largest width of the concave members in the vertical or horizontal sections, ii) the widths of concave members gradually decrease with increases in distance from the middle of the building board, iii) a convex member that is located substantially in the middle of the building board has the smallest width of the convex members in the vertical or horizontal sections, and iv) the widths of the convex members gradually increase with increases in distance from the middle of the building board.

5. The building board according to claim 1, wherein top surfaces of the convex members are in the same plane.

6. The building board according to claim 1, wherein
one or more of the adjacent convex and concave members have a vertical or horizontal taper.

7. The building board according to claim 6, wherein the tapers of the adjacent convex and concave members are arranged in opposite direction.

8. A building board having a curved optical illusion effect, comprising:
said building board having a front and a back surface,
wherein the back of the building board is substantially flat and the front of the building board is configured with a plurality of vertical or horizontal sections each containing a convex member and a concave member that are adjacent to each other, which convex and concave members in the plurality of vertical or horizontal sections are arranged in an alternating pattern, so as to produce an optical illusion of a curved surface when a plurality of said building boards are contiguously joined in a geometric pattern,
wherein an upper half of the front surface has a structure pattern wherein
a width of the concave members of said plurality of vertical or horizontal sections gradually increase from concave member to concave member over at least about one-half of the total length or width of the building board,
a width of the concave members of said plurality of vertical or horizontal sections gradually decreases from concave member to concave member over at least about one-half of the total length or width of the building board,
a width of the convex members of said plurality of vertical or horizontal sections gradually increases from convex member to convex member over at least about one-half of the total length or width of the building board, or
a width of the convex members of said plurality of vertical or horizontal sections gradually decreases from convex member to convex member over at least about one-half of the total length or width of the building board; and
wherein a lower half of the front surface has a structure pattern wherein
a width of the concave members of said plurality of vertical or horizontal sections gradually decreases from concave member to concave member over at least about one-half of the total length or width of the building board,
a width of the concave members of said plurality of vertical or horizontal sections gradually increases from concave member to concave member over at least about one-half of the total length or width of the building board,
a width of the convex members of said plurality of vertical or horizontal sections gradually increases from convex member to convex member over at least about one-half of the total length or width of the building board, or
a width of the convex members of said plurality of vertical or horizontal sections gradually decreases from convex member to convex member over at least about one-half of the total length or width of the building board.

9. The building board according to claim 8, wherein the structure patterns of the upper half and the lower half are substantially identical, except being out of phase by at least about one half of the total length or width of the building board.

10. The building board according to claim 8, wherein a combined width of the adjacent convex and concave member of each of the plurality of vertical or horizontal sections is substantially equal.

11. The building board according to claim 8, wherein top surfaces of the convex members are in the same plane.

12. A building wall structure comprising a plurality of the building boards of claim 1, wherein
the building boards are contiguously joined in a geometric pattern providing a curved optical illusion effect.

13. The building wall structure according to claim 12, wherein
the building boards are contiguously joined in vertical and horizontal directions.

14. A building wall structure comprising a plurality of the building boards of claim 8, wherein
the building boards are contiguously joined in a geometric pattern providing a curved optical illusion effect.

15. The building wall structure according to claim 14, wherein
the building boards are contiguously joined in vertical and horizontal directions.

* * * * *